United States Patent
Einig et al.

(10) Patent No.: US 7,272,481 B2
(45) Date of Patent: Sep. 18, 2007

(54) METHOD AND APPARATUS FOR DETECTING AND CORRECTING TRAILER INDUCED YAW MOVEMENTS IN A TOWING VEHICLE

(75) Inventors: Frank Einig, Ochtendung (DE); Kenneth Doll, Ann Arbor, MI (US); Arnold H. Spieker, Commerce Township, MI (US); Josef Knechtges, Mayen (DE); Ralf Raffauf, Urmitz (DE)

(73) Assignee: Kelsey-Hayes Company, Livonia, MI (US)

( * ) Notice: Subject to any disclaimer, the term of this patent is extended or adjusted under 35 U.S.C. 154(b) by 5 days.

(21) Appl. No.: 11/315,634

(22) Filed: Dec. 22, 2005

(65) Prior Publication Data

US 2006/0173584 A1   Aug. 3, 2006

Related U.S. Application Data (63) Continuation of application No. PCT/US2004/020343, filed on Jun. 25, 2004.

(60) Provisional application No. 60/497,610, filed on Aug. 25, 2003, provisional application No. 60/483,860, filed on Jun. 30, 2003.

(51) Int. Cl.
*G05D 1/00* (2006.01)
*B60T 8/172* (2006.01)

(52) U.S. Cl. .......................................... 701/70; 303/146

(58) Field of Classification Search ............... None
See application file for complete search history.

(56) References Cited

U.S. PATENT DOCUMENTS

| | | | |
|---|---|---|---|
| 4,023,864 A | 5/1977 | Lang et al. | |
| RE30,550 E | 3/1981 | Reise | |
| 5,671,982 A * | 9/1997 | Wanke | 303/146 |
| 5,747,683 A | 5/1998 | Gerum et al. | |
| 5,986,544 A | 11/1999 | Kaisers et al. | |
| 6,012,780 A | 1/2000 | Duvernay | |
| 6,042,196 A | 3/2000 | Nakamura et al. | |
| 6,450,019 B1 | 9/2002 | Wetzel et al. | |
| 6,498,977 B2 | 12/2002 | Wetzel et al. | |
| 6,516,260 B2 | 2/2003 | Wetzel et al. | |
| 6,522,956 B2 | 2/2003 | Hecker et al. | |
| 6,523,911 B1 * | 2/2003 | Rupp et al. | 303/7 |
| 6,659,570 B2 * | 12/2003 | Nakamura | 303/146 |
| 6,909,959 B2 * | 6/2005 | Hallowell | 701/88 |
| 6,959,970 B2 * | 11/2005 | Tseng | 303/146 |

FOREIGN PATENT DOCUMENTS

| | | | |
|---|---|---|---|
| EP | 1167141 A1 * | 1/2002 | |
| WO | WO01/02227 A1 * | 1/2001 | |

* cited by examiner

*Primary Examiner*—Michael J. Zanelli
(74) *Attorney, Agent, or Firm*—MacMillan, Sobanski & Todd, LLC (57) ABSTRACT

An apparatus and method for determining the presence of excessive yaw rate in a vehicle by calculating an instability index that is a function of the vehicle yaw rate and generating an excessive yaw rate signal when the instability index exceeds a yaw rate threshold.

22 Claims, 12 Drawing Sheets

METHOD AND APPARATUS FOR DETECTING AND CORRECTING TRAILER INDUCED YAW MOVEMENTS IN A TOWING VEHICLE

CROSS-REFERENCE TO RELATED APPLICATIONS

This application is a continuation of International Application No. PCT/US2004/020343, filed Jun. 25, 2004, which claims priority from U.S. Provisional Patent Application No. 60/483,860, filed Jun. 30, 2003 and U.S. Provisional Patent Application No. 60/497,610, filed Aug. 25, 2003. The disclosures of all of the applications are incorporated herein by reference.

BACKGROUND OF THE INVENTION

This invention relates in general to vehicle stability control systems and in particular to detection and correction of vehicle yaw movement while the vehicle is towing a trailer.

Figure 1:
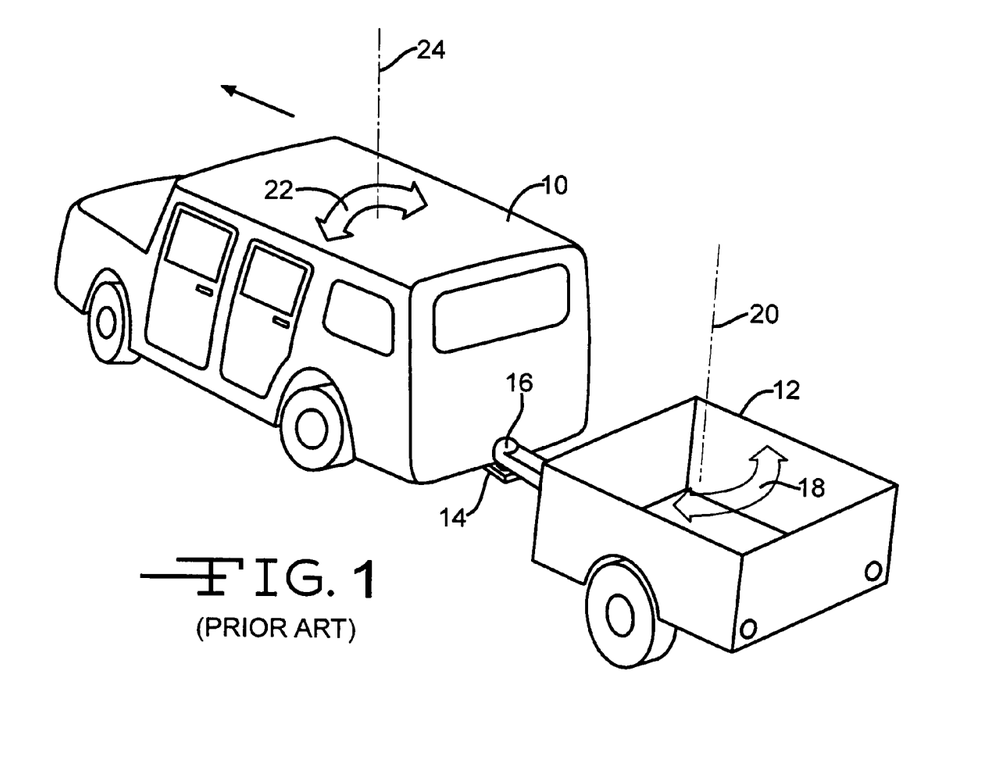
FIG. 1 is a perspective view of a vehicle towing a trailer.

With the increasing popularity of recreational activities such as boating, snowmobiling and similar activities, the need to tow trailers for transporting recreational equipment is increasing. Additionally, many motorists have access to light utility trailers for hauling items. The increasing need to tow trailers has been noted and vehicle manufactures have responded by marketing pickup trucks and sport utility vehicles equipped with trailer towing packages that can include a trailer hitch, a wiring harness and connector for the trailer brake lights and additional cooling capacity for the engine coolant and lubricating oil. A typical vehicle 10 towing a trailer 12 is illustrated in FIG. 1. The towing vehicle 10 is equipped with a trailer hitch 14 that is connected to a trailer tongue 16 that extends from the front of the trailer 12. While a trailer 12 having two wheels is shown, trailers with four or more wheel, usually mounted upon multiple axles are also common. Typically, light trailers do not have trailer brakes and are dependent upon the towing vehicle brakes for slowing and stopping. However, heavier trailers, such as camper trailers are often equipped with electric or hydraulic brake systems.

Due to their nature, trailers are totally controlled by the towing vehicle. Outside factors, such as loading, speed, road conditions, cross winds and movement of the towing vehicle can induce unwanted motions in a trailer. Among such unwanted motions, is rotation, or yaw motion, as represented by the double headed arrow labeled 18 in FIG. 1, about a vertical axis 20 that passes through the center of gravity of the trailer 12. Such yaw motions tend to increase with speed and are transferred through the trailer tongue 16 and hitch 14 to the towing vehicle 10 where similar yaw motions, as represented by the double headed arrow labeled 22, may be induced about a vertical axis 24 passing through the center of gravity of the towing vehicle 10.

The yaw motions of the towing vehicle 10 can develop quite suddenly and, if the vehicle operator does not react quickly, and correctly, can result in loss of directional control of the towing vehicle. An improper response by the towing vehicle operator to trailer induced yaw motions can actually exacerbate the yaw motions. In an extreme situation, the combination of the trailer 12 and vehicle 10 may jackknife, run off the road, or cross into the opposing traffic lane. Any of these results are most unsatisfactory. Additionally, trailers are typically not equipped to detect yaw motion. Accordingly, it would be desirable to be able to detect the development of yaw motions in a towing vehicle sufficiently in advance of a directional stability problem developing to allow time for the vehicle operator to take corrective actions. It also would be desirable to provide such detection by utilizing components already present upon the towing vehicle. It would be further desirable to use brake control systems present upon the vehicle to correct the trailer induced towing vehicle yaw motions before directional control problems develop.

BRIEF SUMMARY OF THE INVENTION

This invention relates to detection and correction of vehicle yaw movement while the vehicle is towing a trailer.

The present invention contemplates an apparatus for detecting excessive yaw motions induced in a towing vehicle by a towed trailer that includes a plurality of vehicle parameter sensors adapted to be mounted upon the towing vehicle and an electronic control unit also adapted to be mounted upon the towing vehicle. The electronic control unit is electrically connected to the towing vehicle parameter sensors and is responsive to signals received from the vehicle parameter sensors to calculate an instability index for the towing vehicle that is a function of the towing vehicle yaw rate. Upon the towing vehicle instability index exceeding a predetermined instability threshold, the electronic control unit generates an excessive yaw motion signal, which in the preferred embodiment, causes an instability flag to be set.

The invention further contemplates that the electronic control unit is operable to determine an intended maximum yaw rate curve and an actual towing vehicle maximum yaw rate curve. The electronic control unit being further operable to determine the instability index as a function of the difference between the intended maximum yaw rate curve and the actual towing vehicle maximum yaw rate curve. The invention also contemplates that the vehicle parameter sensors include a steering angle sensor and a plurality of wheel speed sensors adapted to be mounted upon the towing vehicle. The electronic control unit is responsive to signals received from the steering angle sensor and the wheel speed sensors to calculate a driver intended yaw rate and then use the driver intended yaw rate to calculate the intended maximum yaw rate curve. Additionally, the towing vehicle parameter sensors include a yaw rate sensor adapted to mounted upon the towing vehicle with the yaw rate sensor generating a signal that is proportional to the actual towing vehicle yaw rate. The electronic control unit being responsive to the actual towing vehicle yaw rate to calculate the actual towing vehicle maximum yaw rate curve.

It is further contemplated that the excessive towing vehicle yaw rate detection apparatus may be included in a vehicle stability control system that would be responsive to the excessive yaw rate signal to selectively apply the towing vehicle brakes to reduce the excessive yaw rate.

The present invention also contemplates a method for detecting excessive yaw motions induced in a towing vehicle by a towed trailer that includes the steps of providing a plurality of vehicle parameter sensors adapted to be mounted upon the towing vehicle and an electronic control unit also adapted to be mounted upon the towing vehicle. The electronic control unit is electrically connected to the vehicle parameter sensors and monitors the vehicle parameter sensors and uses the sensor output signals to determine an instability index for the towing vehicle that is a function of the towing vehicle yaw rate. The electronic control unit then compares the instability index to a predetermined instability threshold. As a final step, upon determining that the instability index exceeds the predetermined instability threshold, the electronic control unit generates an excessive yaw motion signal, which in the preferred embodiment, causes an instability flag to be set.

It is further contemplated that the apparatus can be included in an electronic brake control system and that the method further includes, subsequent to the instability flag being set, a step of selectively applying the towing vehicle brakes to reduce the yaw motion of the towing vehicle.

Various objects and advantages of this invention will become apparent to those skilled in the art from the following detailed description of the preferred embodiment, when read in light of the accompanying drawings.

DETAILED DESCRIPTION OF THE INVENTION

Figure 2:
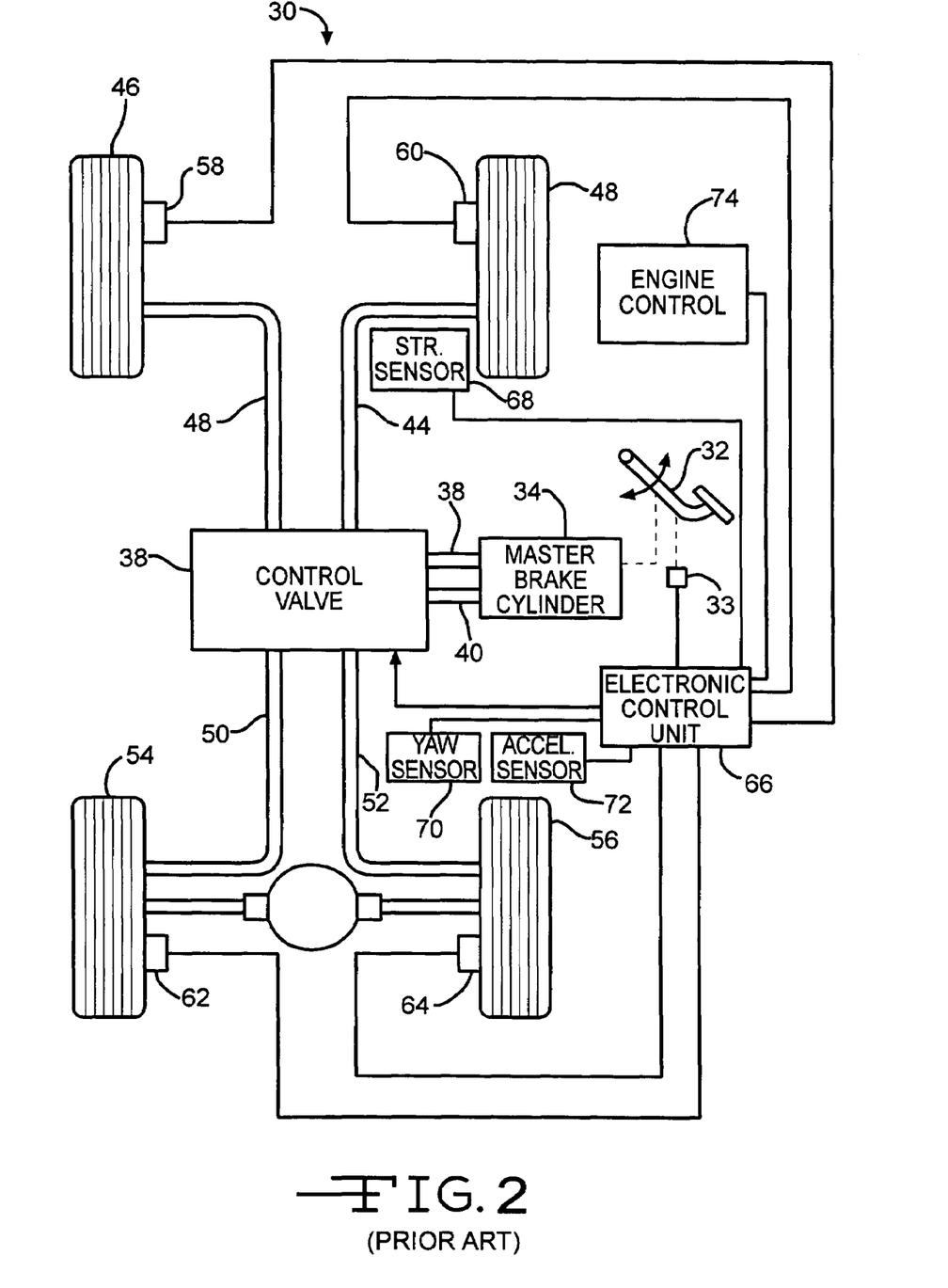
FIG. 2 is a schematic diagram of a typical vehicle stability control system

The present invention contemplates using the components available in a Vehicle Stability Control (VSC) system to detect and correct unwanted yaw motions in a towed trailer. Referring now to the drawings, there is illustrated in FIG. 2, a schematic diagram of a typical VSC system 30. The VSC system 30 is operative to detect deviations in moving vehicle direction from the direction desired and to selectively apply the vehicle wheel brakes to correct the deviation. While a rear wheel drive vehicle is illustrated in FIG. 2, it will be appreciated that VSC systems also are available for front wheel drive and four wheel drive vehicles. The system 30 is intended to be exemplary and it will be appreciated that there are other brake control systems having more or less components.

The VSC system 30 includes a brake pedal 32 that is mechanically connected, as indicated by the dashed lines, to a brake light switch 33 and a dual reservoir master cylinder 34. A first reservoir of the master cylinder 34 supplies hydraulic fluid to a front wheel brake circuit while a second reservoir provides hydraulic brake fluid to a rear wheel brake circuit. Thus, the brake system illustrated in FIG. 2 is vertically split; however, it will be appreciated that the invention also may practiced upon other brake system configurations, such as for example, a diagonally split brake system. In a diagonally split brake system (not shown), the first master cylinder reservoir supplies the left front and right rear wheel brakes while the second master cylinder reservoir supplies the right front and left rear wheel brakes. As shown in FIG. 2, the master cylinder first reservoir is connected to an VSC control valve 36 by a first hydraulic line 38 while the second reservoir is connected to the control valve 36 by a second hydraulic line 40. The VSC control valve 36 includes a plurality of normally open and normally closed solenoid valves (not shown) and a separate source of pressurized hydraulic fluid, such as a motor driven pump (not shown). The pump is typically included within the body of the control valve 36 while the pump motor is mounted upon the exterior thereof.

The control valve 36 is connected by a first pair of hydraulic brake lines 42 and 44 to wheel brakes (not shown) for the left and right front vehicle wheels 46 and 48, respectively. For the vehicle shown in FIG. 2, the front wheels 46 and 48 are non-driven but steerable. Similarly, a second pair of hydraulic brake lines 50 and 52 connect the control valve 36 to wheel brakes (not shown) for the left and right rear vehicle wheels 54 and 56, respectively.

The speed of the front wheels 46 and 48 are monitored by a first pair of wheel associated wheel speed sensors, 58 and 60, respectively. Similarly, the speed of the rear wheels 54 and 56 are monitored by a second pair of associated wheel speed sensors 62 and 64, respectively. The wheel speed sensors 46, 48, 62 and 64 are electrically connected to an VSC Electronic Control Unit (ECU) 66. The ECU 66 also is electrically connected to the bake light switch 33. Closing the brake switch 33 provides a signal to the ECU 66 that the vehicle brakes have been activated. The ECU 66 also is electrically connected to the pump motor and the actuation coils of the solenoid valves included with the control valve 36. The ECU 66 is further electrically connected to several sensors that monitor the dynamics of the towing vehicle 10. One of the sensors is a steering angle sensor 68 that generates a signal that is proportional to the steering angle of the front wheels 46 and 48. Additionally, as shown in FIG. 2, the system 30 also includes a vehicle yaw sensor 70 for measuring vehicle yaw motion and an accelerometer 72 for measuring vehicle lateral acceleration. Both the vehicle yaw sensor 70 and the accelerometer 72 are electrically connected to the ECU 66. Alternately, the wheel speeds may be utilized to calculate a vehicle acceleration, in which case the accelerometer 72 may be omitted. The ECU also is electrically connected to an engine controller 74. The ECU 66 receives engine speed signals from the engine controller 74 and is operative to send control signals to the engine controller 74 for changing the engine torque. The ECU 66 further includes a microprocessor with a memory that stores a VSC control algorithm.

During vehicle operation, the microprocessor in the ECU 38 continuously receives speed signals from the wheel speed sensors 58, 60, 62 and 64. Additionally, the microprocessor receives input signals from the steering angle sensor 68, the yaw sensor 70, the accelerometer 72 and the engine controller 74. The ECU microprocessor is operative to detect any excessive deviation of the vehicle direction from the desired vehicle direction. The ECU 66 is responsive to the excessive deviation to selectively operate the solenoid valves in the control valve 36 to apply the vehicle wheel brakes to generate a counter brake torque to correct the directional deviation. Thus, if the vehicle 10 begins to bear excessively left, one or both of the right wheel brakes are applied to cause a braking moment to swing the vehicle 10 to the right. If needed, the ECU 66 also can send a control signal to the engine controller 74 to reduce the engine torque. While the system 30 has been described in terms of VSC, the components also can be utilized, with the appropriate control algorithm, to provide Traction Control (TC) and Anti-lock Brake Control (ABC) functions for the towing vehicle 10.

The present invention contemplates an ECU control algorithm that utilizes the components of the VSC system 30 shown in FIG. 2 to determine that a towing vehicle 10 is experiencing excessive yaw motions induced by a towed trailer 12. The invention also contemplates that the algorithm is responsive to excessive towing vehicle yaw motions to selectively apply the towing vehicle wheel brakes to reduce or eliminate the vehicle yaw motions. As will be described below, the invention further contemplates combining the braking with engine torque reduction.

Figure 3A:
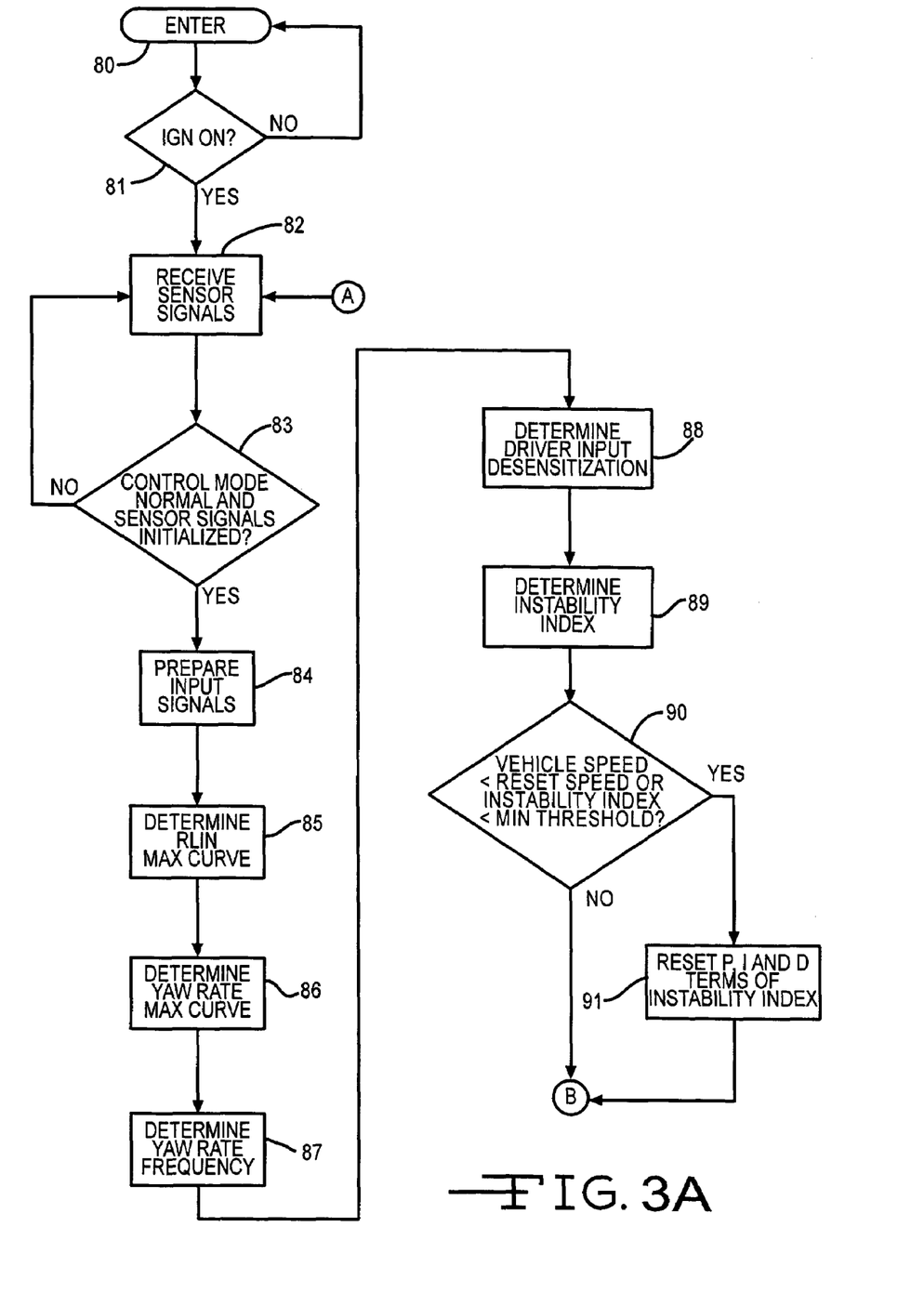
FIG. 3 is a flow chart for an algorithm for detecting and correcting trailer yaw motion that is accordance with the present invention.
Figure 3B:
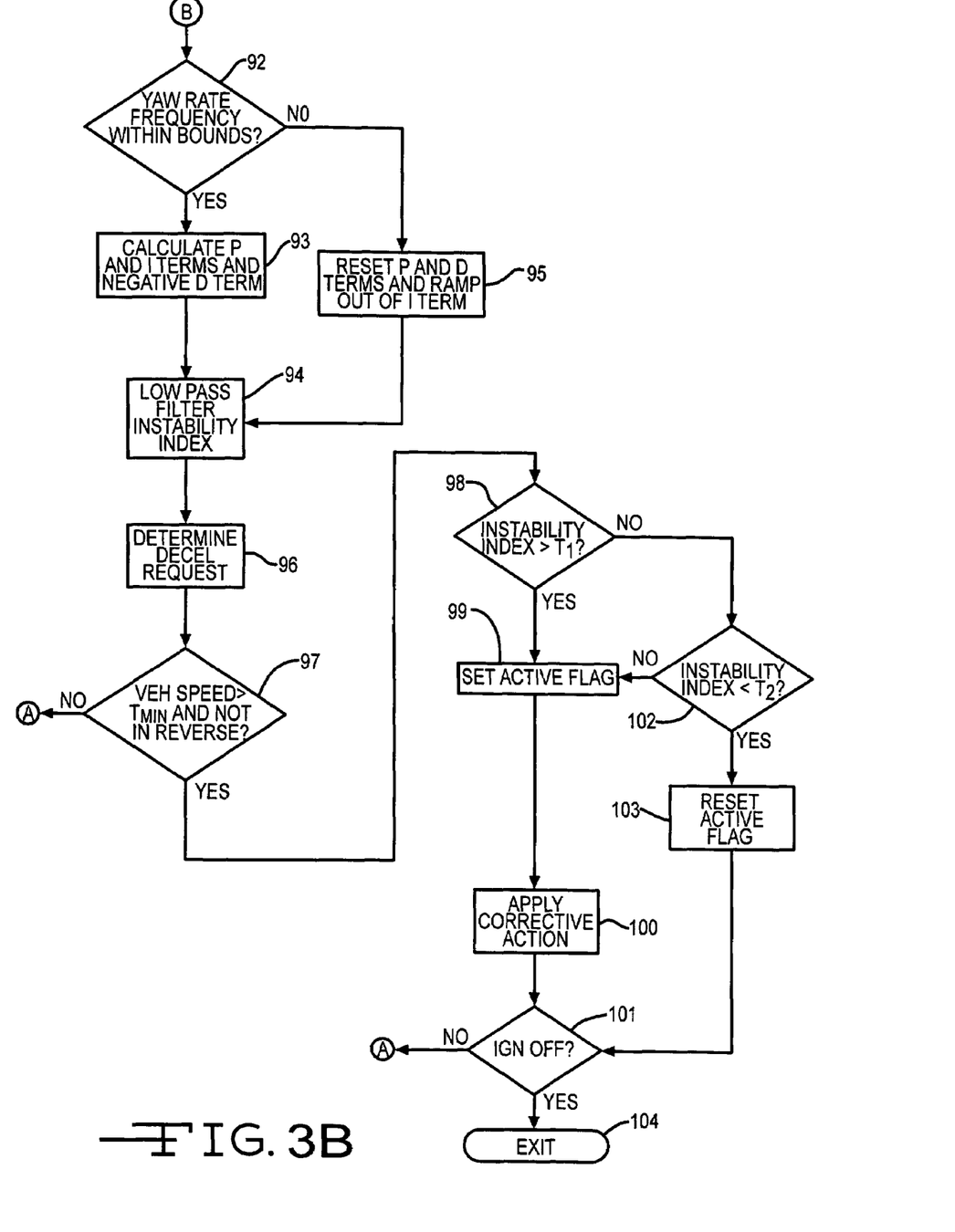

An overall flow chart for the yaw detection and reduction algorithm is illustrated in FIG. 3. The flow chart is entered through block 80 and proceeds to decision block 81 where the algorithm determines whether the vehicle ignition is in the on position. If the ignition is not in the on position, the algorithm returns to block 80. If the ignition is in the on position, the algorithm advances to functional block 82 where the microprocessor in the ECU 66 receives signals from the vehicle sensors. These sensor signals include wheel speed signals from the wheel speed sensors 58, 60, 62 and 64. The microprocessor also receives steering direction data from the steering angle sensor 68 and engine speed data from the engine controller 74. Vehicle motion data is received by the microprocessor from the vehicle yaw sensor 70 and the acceleration sensor 72. The algorithm then advances to decision block 83 where it is determined that control mode is normal and the sensor signals are initialized. If the control mode is normal and the sensor signals are initialized the algorithm continues to functional block 84 where the data received from the sensors are prepared for utilization in the calculations in the following functional blocks. If control mode is not normal and the sensor signals are not initialized in decision block 83, the algorithm returns to functional block 82.

Figure 5:
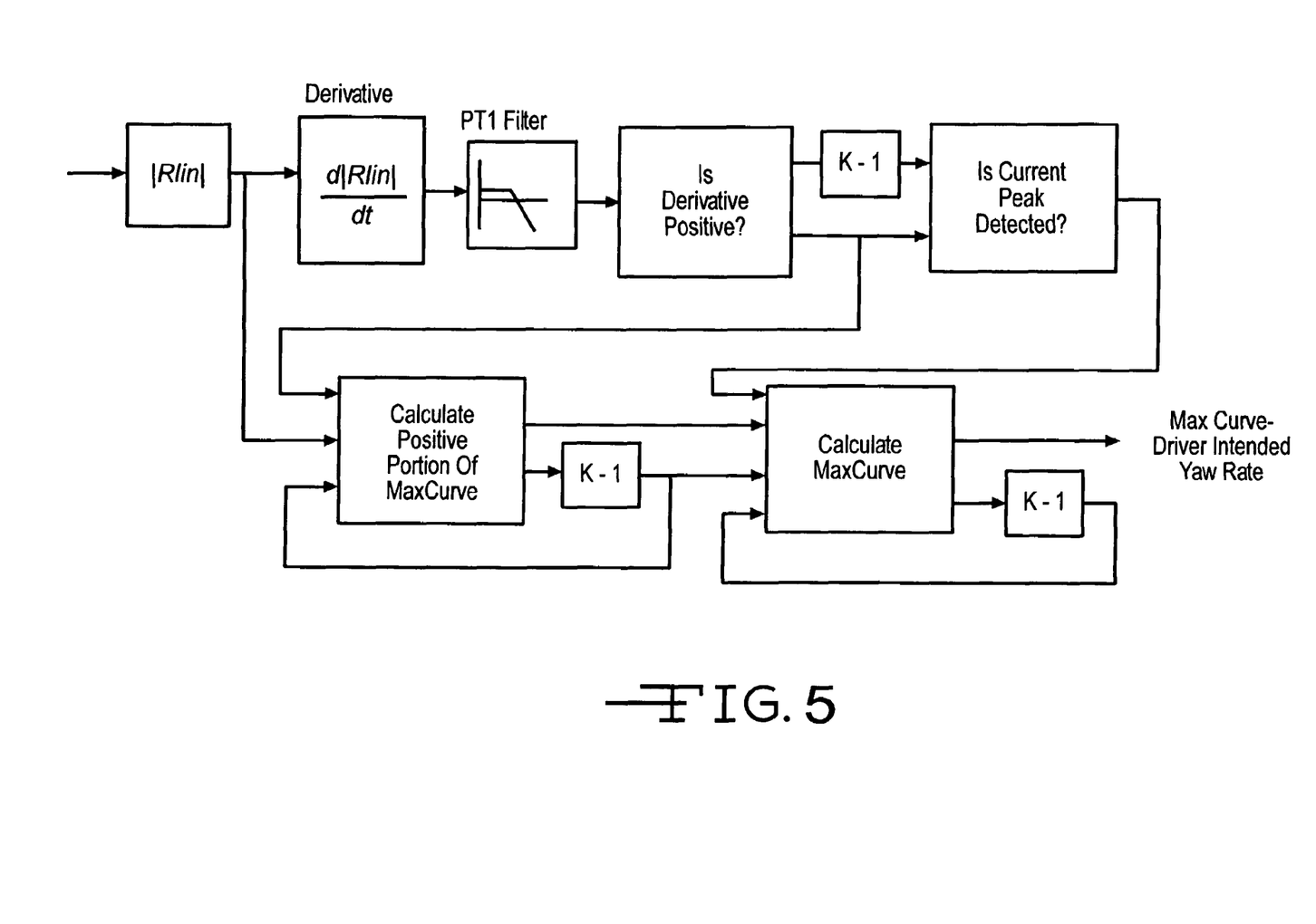
FIG. 5 is a block diagram that illustrates the derivation of an intended vehicle yaw rate max curve.
Figure 6:
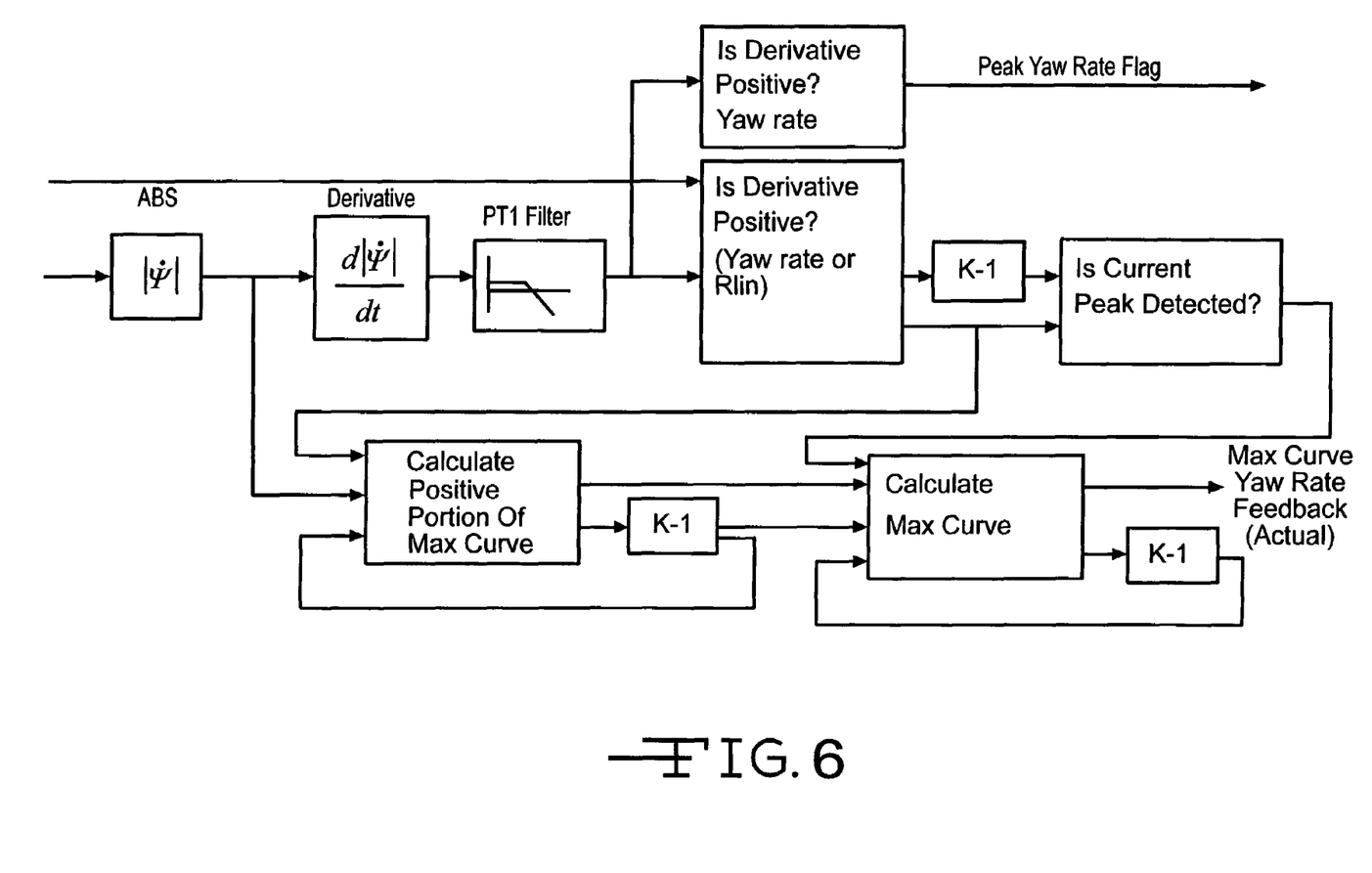
FIG. 6 is a block diagram that illustrates the derivation of an actual vehicle yaw rate max curve.
Figure 7:
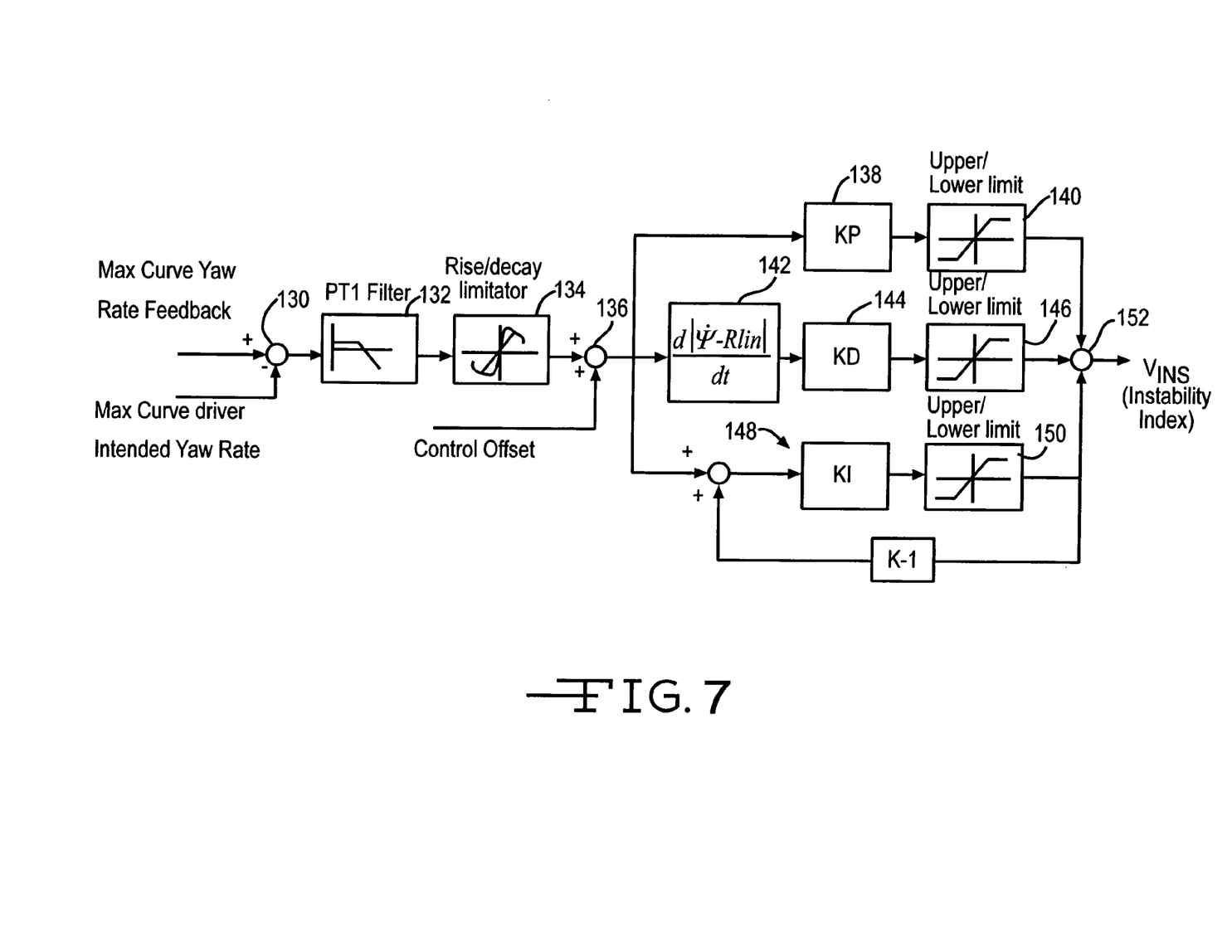
FIG. 7 is a block diagram that illustrates the derivation of an instability indicator from the yaw max rate curves derived from FIGS. 5 and 6.

Following preparation of the sensor data in functional block 84, the algorithm advances to functional block 85 where a maximum curve of a driver intended yaw rate, Rlin, is determined. The determination of the Rlin maximum curve is illustrated in FIG. 5 and explained in detail below. The algorithm continues to functional block 86 where a maximum curve of the towing vehicle yaw rate is determined. The determination of the yaw rate maximum curve is illustrated in FIG. 6 and explained in detail below. The algorithm then continues to functional block 87 where the towing vehicle yaw rate frequency is determined. The algorithm advances to functional block 88 where a desensitization factor that is a function of the instantaneous driver intended yaw rate is determined. The algorithm then continues to functional block 89 where an instability index $V_{INS}$ is determined as a function of the Rlin maximum curve, the yaw rate maximum curve and the desensitization factor as determined in preceding functional blocks 85, 86 and 88, respectively. The determination of $V_{INS}$ is illustrated in FIG. 7 and explained in detail below. As will be explained below, the instability index is a sum of proportional, integral and derivative terms. The algorithm then advances to decision block 90.

In decision block 90, the towing vehicle speed is compared to a predetermined reset speed and the instability index $V_{INS}$ determined in functional block 89 is compared to an instability index minimum threshold. If either the towing vehicle speed is less than the reset speed or the instability index is less than the instability index minimum threshold, the algorithm transfers to functional block 91. In functional block 91 the proportional, integral and derivative terms of the instability index $V_{INS}$ are reset. The algorithm then advances to decision block 92. If, in decision block 90, the towing vehicle speed is greater than, or equal to, the reset speed and the instability index is also greater than, or equal to, the instability index minimum threshold, the algorithm advances directly to decision block 92.

In decision block 92 the actual towing vehicle yaw rate frequency, as determined in functional block 87, $V_{YF}$, is compared to a frequency range that is a function of the actual towing vehicle yaw rate magnitude. In the preferred embodiment, the lower limit, $f_1$, on the frequency range is 0.4 Hz, while the upper limit, $f_2$, is 1.1 Hz; however, other values for the frequency range bounds also may be used. If the vehicle yaw frequency falls within the frequency range, the algorithm transfers to functional block 93 where the proportional and integral terms and a negative derivative term of the instability $V_{INS}$ index are calculated. The algorithm then continues to functional block 94. Should the vehicle yaw frequency fall outside of the frequency range in decision block 92, the algorithm transfers to functional block 95 where the proportional and derivative terms of the instability index are reset and the algorithm ramps out of the integral term. The algorithm then continues to functional block 94.

In functional block 94, the instability index is passed through a low pass filter. The algorithm then advances to functional block 96 where a deceleration request is determined for potential use as a corrective action. The algorithm then continues to decision block 97.

The inventors have determined that trailer yaw motion is speed sensitive. Therefore, in decision block 97, it is determined whether actual the towing vehicle speed $V_S$ is greater than a minimum speed threshold, $T_{MIN}$. If the towing vehicle speed is less than, or equal to $T_{MIN}$, the algorithm returns to functional block 82 for the next iteration. Also, the algorithm is not intended for use when the towing vehicle 10 and trailer are backing. Accordingly, the direction of movement of the towing vehicle also is checked in decision block 97. If the towing vehicle 10 is moving in reverse in decision block 97, the algorithm returns to functional block 82 for the next iteration. Only if the towing vehicle is not in reverse and the towing vehicle speed is above $T_{MIN}$ in decision block 87, does the algorithm transfer to decision block 98.

In decision block 98, the towing vehicle instability index $V_{INS}$ is compared to a first excessive yaw threshold, $T_1$. If the towing vehicle instability index $V_{INS}$ is greater than the first excessive yaw threshold $T_1$, the algorithm determines that the trailer 12 is experiencing excessive yaw movement and advances to decision block 99 where a trailer yaw flag is set to activate corrective action. The algorithm then advances to functional block 100 where one or more available corrective actions are applied to the towing vehicle 10 to reduce and/or eliminate the trailer yaw motion. Various possible correction actions are described below. The algorithm then continues to decision block 101. If, in decision block 98, it is determined that the instability index is less than, or equal to, the first excessive yaw threshold, $T_1$, the algorithm transfers to decision block 102 where the instability index is compared to a second excessive yaw threshold, $T_2$, that is less than the first excessive yaw threshold $T_1$. The second excessive yaw threshold $T_2$ is selected to be less than the first excessive yaw threshold $T_1$ to introduce hysteresis and thereby avoid "hunting" within the algorithm. If, in decision block 102, the instability index has fallen below the second excessive yaw threshold $T_2$, the algorithm advances to functional block 103 where the trailer yaw flag is reset. The algorithm then advances to decision block 101.

In decision block 101, the vehicle status is compared to an algorithm end criteria. As shown in FIG. 3, the algorithm ends when the vehicle ignition switch has been returned to the off position. If the vehicle ignition switch has not been returned to the off position, the algorithm returns to functional block 82 for the next iteration. If the vehicle ignition switch has been returned to the off position in decision block 101, the algorithm exits through bock 104.

The invention also contemplates several additional optional criteria that are not shown in FIG. 3. Thus, the invention also may be practiced with a requirement that yaw frequency rate remain within the frequency range for a predetermined time period before the corrective action is applied. Such a feature would be implemented by adding a timer loop (not shown) between decision block 92 and decision block 93. Similarly, the invention may also require that the towing vehicle speed remain above the minimum speed threshold $T_{MIN}$ for a predetermined time period before the corrective action is applied. Such a feature could be implemented by adding a timer loop (not shown) after decision block 97. While decision block 97 requires that the vehicle not be moving in reverse, an alternate version would require that the vehicle be moving in the forward direction (not shown) before proceeding.

Figure 4:
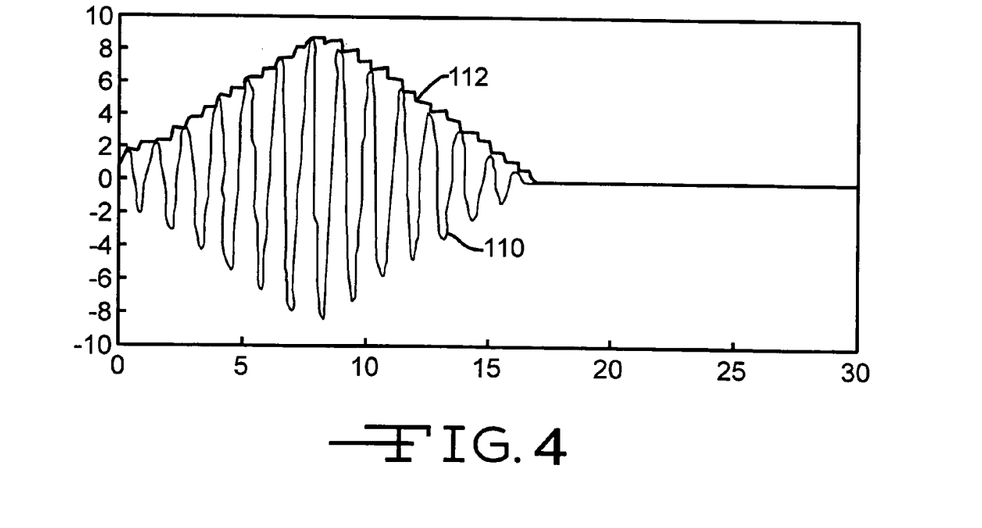
FIG. 4 illustrates a max yaw rate curve utilized in the present invention.

As shown in FIG. 3, the determination of the presence of excessive yaw motion in a vehicle towing a trailer is determined by a comparison in decision block 98 between an instability index and the first excessive yaw threshold $T_1$. The calculation of the instability index $V_{INS}$ will now be described with reference to FIGS. 4 through 7. Basically, the instability index $V_{INS}$ is a function of the difference between a maximum curve for the towing vehicle yaw rate, or yaw rate feedback, and a maximum curve for driver intended yaw rate, Rlin. A typical such maximum yaw rate curve is illustrated in FIG. 4 where the increasing and then damped sinusoidal curve labeled 110 represents either the instantaneous driver intended vehicle yaw rate or the yaw rate feedback. The maximum yaw rate curve labeled 112 and each of the steps comprising the curve represents the absolute value of the maximum magnitude of each of the excursions of the instantaneous yaw rate curve 110.

A block diagram that illustrates the derivation of the driver intended vehicle yaw rate maximum curve is shown in FIG. 5. As described above, the factor Rlin represents the driver intended yaw rate that is obtained from the steering angle sensor data and the vehicle speed. As shown in FIG. 5, a derivative of the absolute valve of the yaw rate is filtered and then compared to a previous value to find a peak. The peak is then used with the absolute value of the yaw rate to calculate a current value for the intended vehicle yaw rate maximum curve.

Similarly, a block diagram that illustrates the derivation of the actual vehicle yaw rate maximum curve is shown in FIG. 6 and includes steps similar to the steps described above for FIG. 5 to convert $\dot{\psi}$ into the actual vehicle yaw rate maximum curve. In FIG. 6, the factor $\dot{\psi}$ represents the actual vehicle yaw rate that is obtained from the vehicle yaw rate sensor 70. Because the actual vehicle yaw rate is compared to the driver intended vehicle yaw rate, the actual vehicle yaw rate can be considered as a feedback yaw rate, as shown at the right side of FIG. 6.

The yaw rate maximum curves derived as shown in FIGS. 5 and 6 are combined and an instability index $V_{INS}$ determined in the block diagram illustrated in FIG. 7. At the summing point labeled 130 that is to the left of FIG. 7, the maximum driver intended yaw rate curve derived in functional block 85 of FIG. 3, as shown in FIG. 5, is subtracted from the maximum actual yaw rate, or feedback yaw rate, curve derived in functional block 86 of FIG. 3, as shown in FIG. 6. The resulting difference is first passed through a low pass filter 132 and then through a rise and decay limiter 134. A control offset, or driver input desensitization, that is a function of the instantaneous driver intended yaw rate and is determined in functional block 88 of FIG. 3, is added to the signal at the summing point labeled 136.

The resulting signal is then operated upon by three different operators in the right portion of FIG. 7. In the upper portion of FIG. 7, the signal is multiplied by a proportionality constant KP in the block labeled 138. The resulting proportional term is passed through a first limiter 140 that keeps the result within upper and lower limits. In the middle portion of FIG. 7, the derivative of the signal is taken in the block labeled 142. The resulting derivative term is multiplied by a differential constant KD in block 144 and then passed through a second limiter 146. Finally, in the lower portion of FIG. 7, the signal is integrated at 148 and the integral term is multiplied by a integrator constant KI. The signal is then passed through a third limiter 150. In the preferred embodiment, the resulting three terms are combined at the summing point at the right end of FIG. 7 that is labeled 152 to produce the stability indicator $V_{INS}$. The stability indicator $V_{INS}$ is compared to the first stability activation threshold $T_1$ in decision block 98 in FIG. 3.

Figure 8:
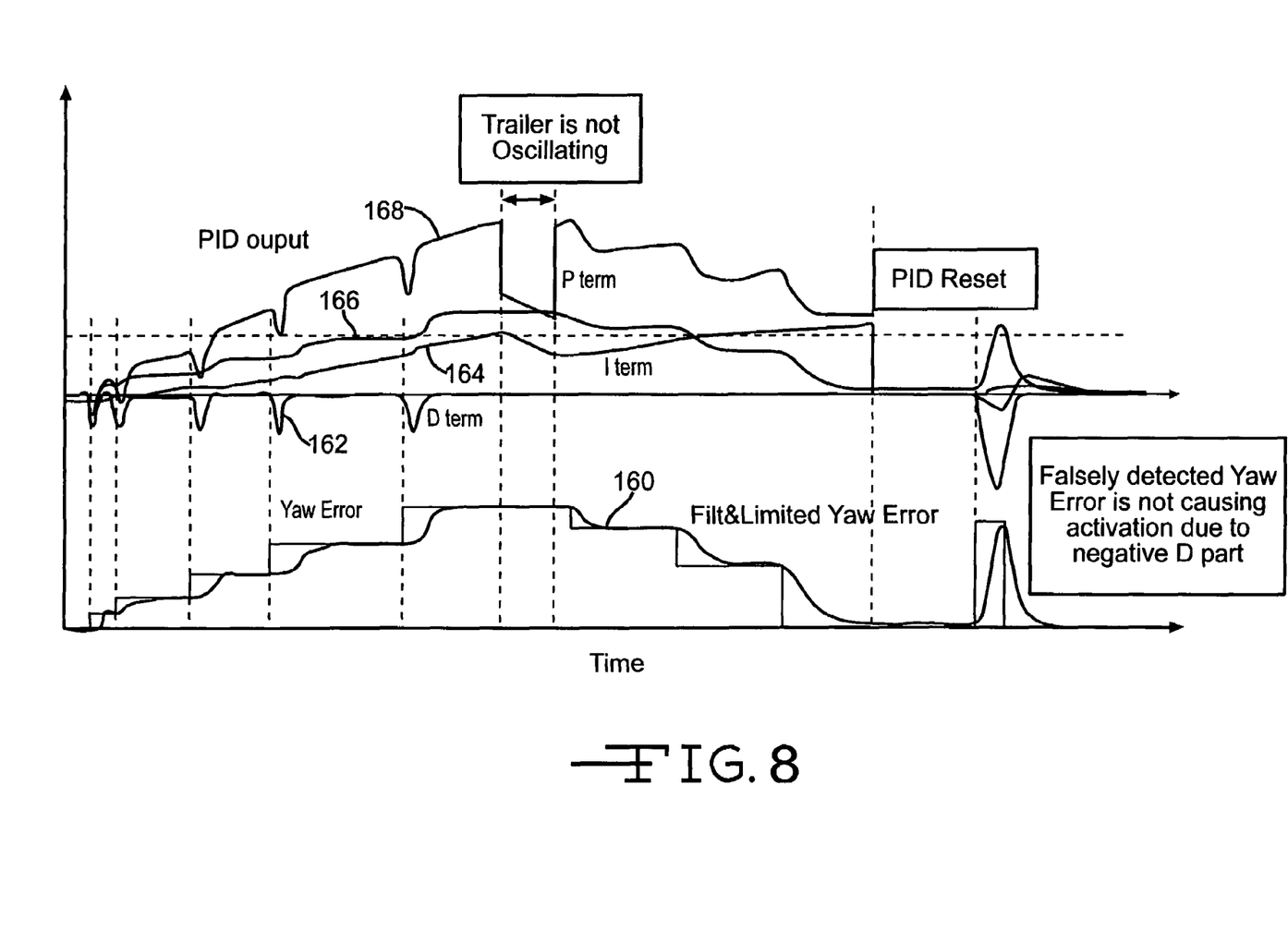
FIG. 8 illustrates typical signals generated by the components shown in FIG. 7.

Typical curves for the values determined within the block diagram shown in FIG. 7 are illustrated in FIG. 8. The lower curve 160 in FIG. 8 represents the filtered and limited difference, or error, between the intended and actual, or feedback, yaw rate maximum curves as derived in the left portion of FIG. 7. The middle set of three curves represents the values derived in the right portion of FIG. 7. The lowest curve in the middle set of curves is labeled 162 and represents the differential term resulting from the differential operator 142 shown in the middle operation at the right of FIG. 7. The middle curve in the set of curves, which is labeled 164, represents the integral term resulting from the integration operator 148 shown in the lower operation of FIG. 7. The upper curve in the set of curves, which is labeled 166, represents the proportional term resulting from the proportional operator 138 shown in the upper operation of FIG. 7. The uppermost curve in FIG. 8, which is labeled 168 is the sum of the three curves 162, 164 and 166 shown below it and thus represents the instability index $V_{INS}$, which is a PID output signal. The negative differential part of the PID signal prevents a falsely detected yaw error from causing activation of trailer yaw correction actions.

Figure 9:
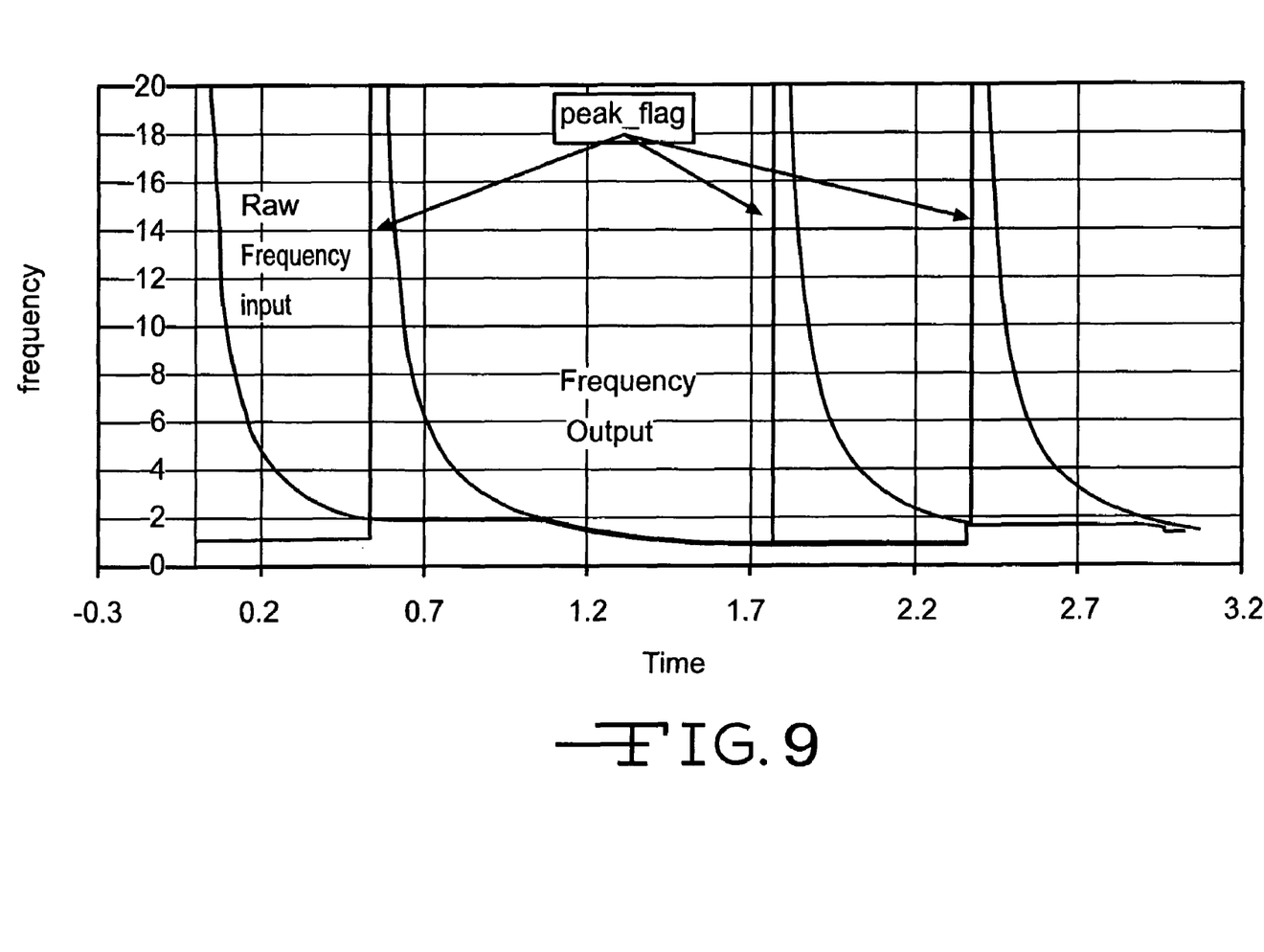
FIG. 9 illustrates typical frequencies associated with the actual vehicle yaw signal.

The frequency associated with the PID signal in FIG. 8 is illustrated in FIG. 9. As described above, the control algorithm continuously determines the frequency of the actual vehicle yaw raw. The peak yaw rate flag shown in FIG. 9 represents the local maximum of the actual vehicle yaw rate. As indicated above, in decision block 92 of FIG. 3, one of the criteria for determining that the trailer yaw rate motions are excessive, is that the actual vehicle yaw rate frequency is within a predetermined frequency range that is a function of the actual yaw rate magnitude.

Figure 10:
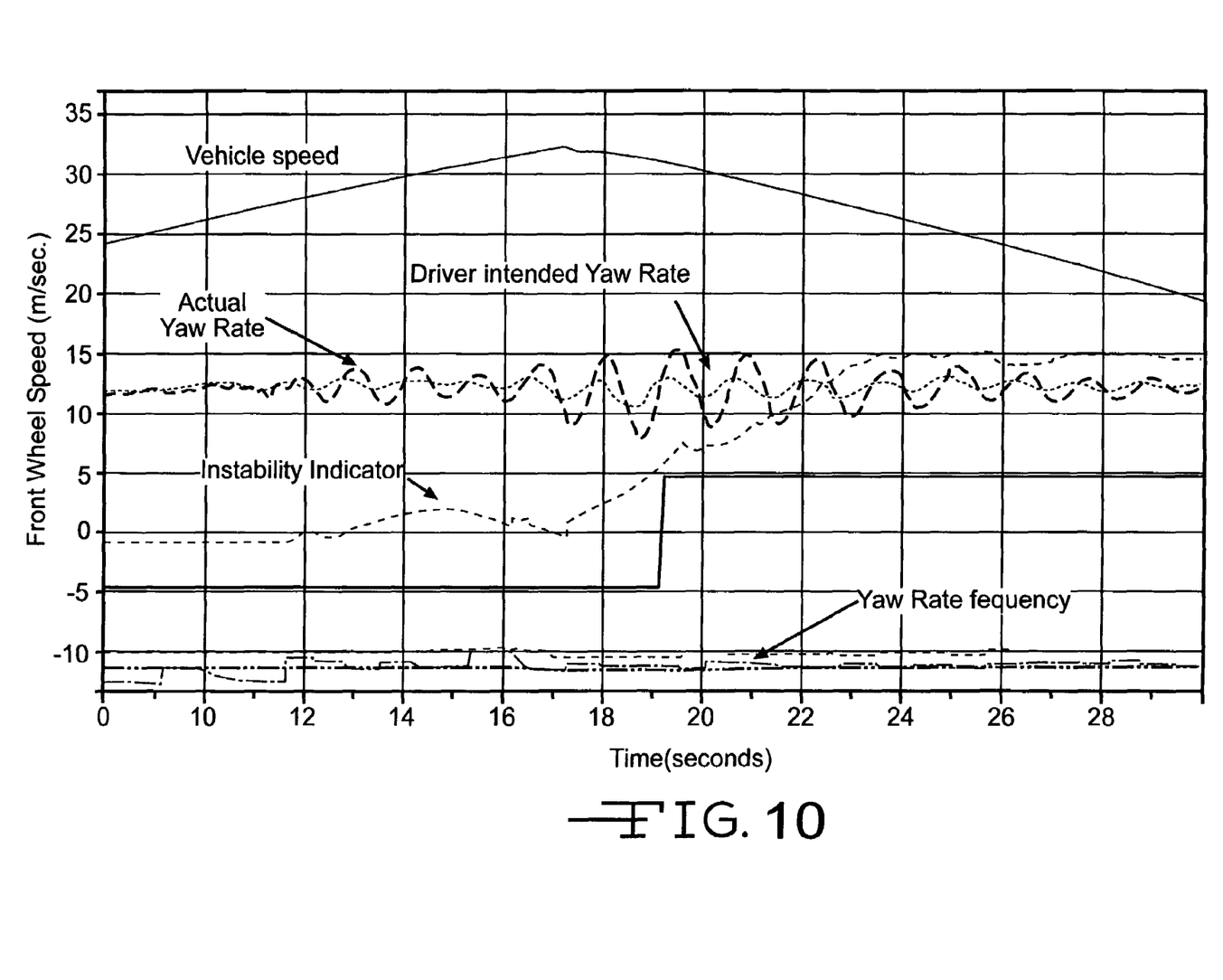
FIG. 10 illustrates various vehicle parameters during an application of the towing vehicle rear brakes to correct of excessive towing vehicle yaw motions.

Once it has been determined that the trailer is experiencing excessive yaw motions, one of several types of corrective measures can be applied. The first type of corrective measure includes deceleration of the vehicle and trailer by applying only the towing vehicle brakes. The braking can accomplished by actuating only the rear wheel brakes, only the front wheel brakes, or both the front and rear wheel brakes. When the brakes on only one axle are applied, the rear wheel brakes are preferred over the front wheel brakes. In the preferred embodiment, the towing vehicle brakes are applied to provide a deceleration rate that is within the range of 1.0 to 7.0 meters/second$^2$; however, other deceleration rates may also be used. For example, in an alternate embodiment, the deceleration rate may be selected to be within the range of 1.5 to 5.0 meters/second$^2$. Additionally, the ECU 66 may send a control signal, as determined in functional block 96 of FIG. 3, to the engine controller 74 to reduce the towing vehicle engine torque. An example of trailer yaw motion control by application of the towing vehicle wheel brakes is illustrated by the graphs shown in FIG. 10. The graphs show that, as the vehicle speed increases, actual towing vehicle yaw motions induced by the trailer develop and diverge from the driver intended yaw rate. The trailer brakes are then actuated. In the example shown, the towing vehicle 10 and trailer 12 are decelerated at a constant rate of 1.2 meters/second$^2$. As the vehicle and trailer slow, the actual yaw rate excursions are reduced until they again approximate the driver intended yaw rate curve.

With regard to the deceleration rates resulting from the brake applications, in the preferred embodiment, the invention contemplates using two deceleration rates with the selected deceleration rate being determined by the magnitude of the instability index $V_{INS}$. When the instability index $V_{INS}$ exceeds the first instability threshold $T_1$, the ECU is responsive to apply a medium deceleration to counter the vehicle yaw motios. Typical medium deceleration rates may be within a range 4.0 to 5.0 meters/second$^2$. If the instability index $V_{INS}$ drops below the first instability threshold $T_1$, but still exceeds the instability threshold $T_2$, the ECU 66 is responsive to apply a low deceleration to counter the vehicle yaw motions. Typical low deceleration rates may be within a range 1.0 to 3.0 meters/second$^2$.

The invention also contemplates another alternate embodiment where the deceleration rate applied to the vehicle brakes is continuously variable as a function of one or more vehicle parameter (not shown). For example, the deceleration may be either a linear or non-linear function of the towing vehicle speed.

A second type of corrective measure contemplated by the invention applies to a vehicle towing a trailer that is equipped with trailer brakes. The trailer brakes would typically be actuated by a trailer brake control unit upon detection of vehicle deceleration. For the second type of corrective measure, the trailer is braked with a slightly higher deceleration rate than that of the towing vehicle. For example, if the towing vehicle is braked at 2.0 meters/second$^2$ the trailer could be braked at 2.0 meters/second$^2$+an offset, such as, for example, an offset selected from within a range of 0.2 to 0.5 meters/second$^2$. The offset could be either programmed into the trailer brake controller or supplied independently to the trailer brakes by the ECU 66.

A third type of corrective measure would also apply to a trailer equipped with trailer brakes. The third corrective measure contemplates deceleration of the towing vehicle as described above combined with an independent trailer brake application to generate a counter brake torque in opposition to the trailer yaw motions. Thus, if the trailer is yawing to the left, the left trailer brake would be applied to swing the trailer back to the right.

Figure 11:
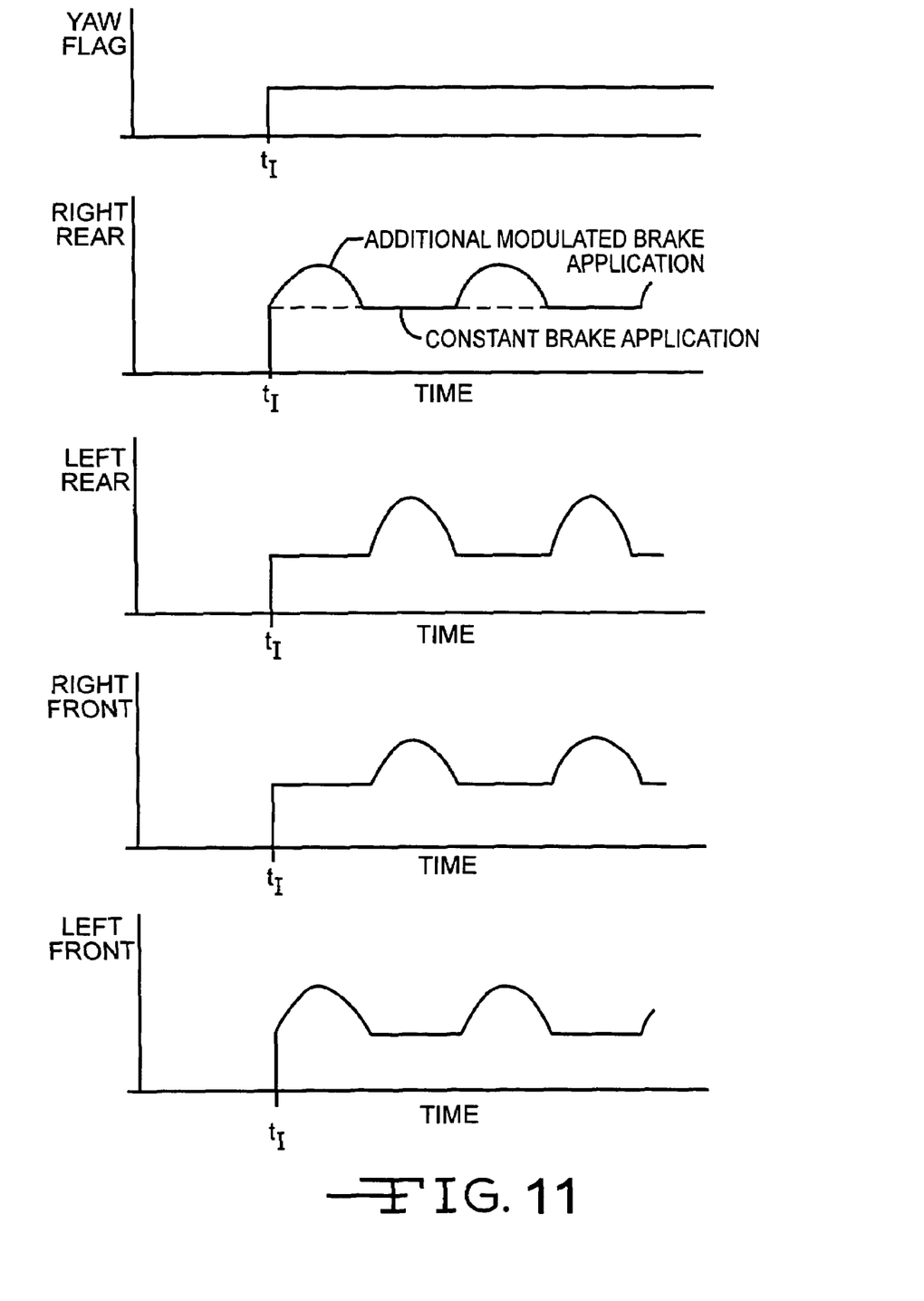
FIG. 11 illustrates an alternate towing vehicle braking action to correct excessive trailer yaw motions where the towing vehicle has a diagonally split brake system.

Finally, a fourth type of corrective measure is contemplated in which the towing vehicle brakes are applied to provide a counter brake torque in opposition to the trailer yaw motions. The fourth corrective measure can be applied to only the towing vehicle brakes or, if the trailer is equipped with brakes, in combination with a trailer brake application. An example of the fourth type of corrective measure is illustrated in FIG. 11 where the pressure of the hydraulic fluid at each of the towing vehicle wheel brakes is shown as a function of time for a diagonally split towing vehicle brake system. As shown in FIG. 11, a constant brake pressure is applied to all of the towing vehicle wheel brakes at $t_f$ to slow both the towing vehicle 10 and trailer 12. Additional pressure is applied to the right rear and left front wheel brakes to generate a yaw countering brake torque. The additional pressure is modulated in magnitude and timing, as shown in FIG. 11 to oppose the trailer induced vehicle yaw motions. For the example shown in FIG. 11, the resulting induced brake torque would tend to swing the towing vehicle 10 to the right. Upon completion of the modulation of right rear and left front wheel brakes, a similar additional pressure modulation is applied to the right front and left rear wheel brakes. This corrective measure allows the towing vehicle operator to apply additional pressure to the towing vehicle brakes while the measure is being applied or to brake through a traction or vehicle stability control cycle.

While the additional brake pressure modulation is shown in FIG. 11 as being applied to four of the wheel brakes, it will appreciated that the brake pressure modulation also may be applied to only the front wheel brakes or to only the rear wheel brakes of the towing vehicle 10. However, when the pressure applied to only two of the towing vehicle wheel brakes is modulated, the resulting brake torque is less than that obtained by modulating the pressure applied to all four of the towing vehicle wheel brakes. This corrective measure also allows the towing vehicle operator to apply additional pressure to the towing vehicle brakes while the measure is being applied or to brake through a traction or vehicle stability control cycle.

Figure 12:
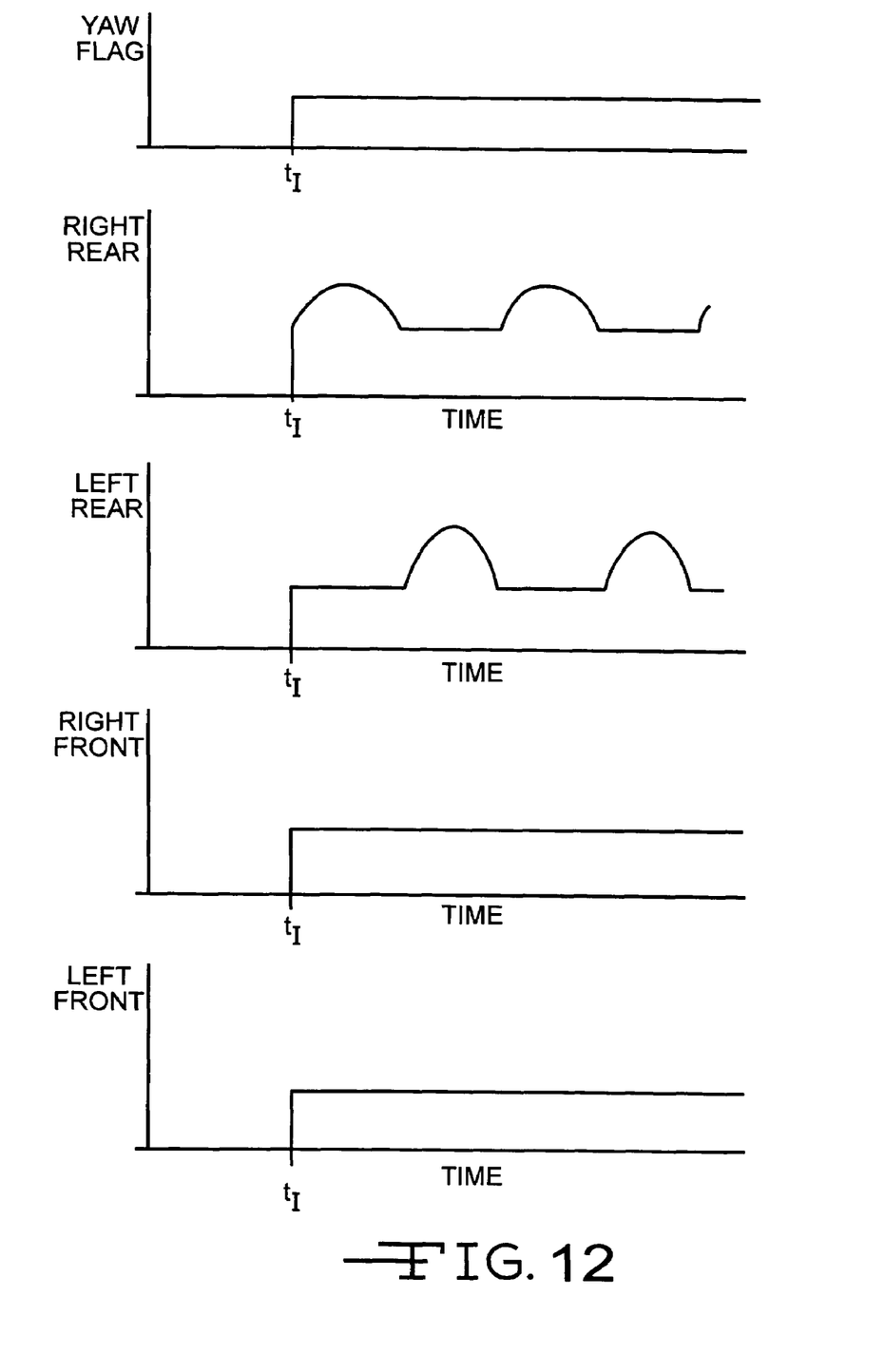
FIG. 12 illustrates another alternate towing vehicle braking action to correct excessive trailer yaw motions where the towing vehicle has a vertically split brake system.

An alternate embodiment of the fourth type of corrective action is illustrated in FIG. 12 for a vertically split brake system. Again, the corrective action is initiated at $t_f$. As shown in FIG. 12, while all four wheel brakes are applied, only the rear wheel brakes are modulated with extra pressure. Similarly, the invention also may be practiced with a vertically split brake system in which all four wheel brakes are applied, but only the front wheel brakes are modulated with extra pressure (not shown).

The invention further contemplates another alternate embodiment in which the towing vehicle and trailer yaw movements are monitored to determine an optimal time for applying the brakes. When such an optimal time is determined, the control unit delays the brake application until both the instability factor exceeds the first excessive yaw threshold $T_1$ and the optimum moment for inducing a stabilizing brake moment has arrived.

The principle and mode of operation of this invention have been explained and illustrated in its preferred embodiment. However, it must be understood that this invention may be practiced otherwise than as specifically explained and illustrated without departing from its spirit or scope.

What is claimed is:

1. An apparatus for correcting excessive yaw induced in a towing vehicle by a towed trailer, the apparatus comprising:
   a control valve adapted to be connected to the towing vehicle hydraulic brake system, said control valve operable to selectively actuate the towing vehicle wheel brakes;
   a plurality of vehicle parameter sensors adapted to be mounted upon the towing vehicle; and
   an electronic control unit also adapted to be mounted upon the towing vehicle, said electronic control unit electrically connected to said control valve and said vehicle parameter sensors, said control unit responsive to signals received from said vehicle parameter sensors to calculate an instability index for the combination of the towing vehicle and the towed trailer that is a function of the towing vehicle yaw rate and upon said instability index exceeding a predetermined instability threshold, said control unit is further responsive to cause said control valve to selectively apply the towing vehicle brakes to counter the towing vehicle yaw motion.

2. An apparatus for correcting excessive yaw induced in a towing vehicle by a towed trailer, the apparatus comprising:
   a control valve adapted to be connected to the towing vehicle hydraulic brake system, said control valve operable to selectively actuate the towing vehicle wheel brakes;
   a plurality of vehicle parameter sensors adapted to be mounted upon the towing vehicle; and
   an electronic control unit also adapted to be mounted upon the towing vehicle, said electronic control unit electrically connected to said control valve and said vehicle parameter sensors, said electronic control unit being responsive to signals received from said vehicle parameter sensors to determine an intended maximum yaw rate curve and an actual towing vehicle maximum yaw rate curve and to calculate an instability index for the towing vehicle that is a function of the difference between said intended maximum yaw rate curve and said actual towing vehicle maximum yaw rate curve, said electronic control unit being further responsive, upon said instability index exceeding a predetermined instability threshold to cause said control valve to selectively apply the towing vehicle brakes to counter the towing vehicle yaw motion.

3. The apparatus according to claim 2 wherein said towing vehicle parameter sensors include a steering angle sensor and a plurality of wheel speed sensors adapted to be mounted upon the towing vehicle, said electronic control unit being responsive to signals received from said steering angle sensor and said wheel speed sensors to calculate a driver intended yaw rate and further wherein said intended maximum yaw rate curve is a function of said driver intended yaw rate.

4. The apparatus according to claim 3 wherein said towing vehicle parameter sensors include a yaw rate sensor adapted to be mounted upon the towing vehicle, said yaw rate sensor generating a signal that is proportional to the actual towing vehicle yaw rate and further wherein said actual towing vehicle maximum yaw rate curve is a function of said towing vehicle yaw rate.

5. The apparatus according to claim 2 wherein said instability threshold is a first instability threshold and further wherein said electronic control unit continues to selectively apply the towing vehicle brakes until the instability index is reduced below a second instability threshold that is less than said first instability threshold.

6. The apparatus according to claim 5 wherein said control unit is further operative to determine a frequency associated with said towing vehicle yaw motion, said control unit being further operative to selectively apply the towing vehicle brakes only when said frequency is within a frequency range.

7. The apparatus according to claim 6 wherein said control unit is operative to selectively apply the towing vehicle brakes only when said frequency has remained within said frequency range for a predetermined time period.

8. The apparatus according to claim 6 wherein said control unit is further operative to monitor the towing vehicle velocity, said control unit being further operative to selectively apply the towing vehicle brakes only when said towing vehicle velocity is greater than a towing vehicle velocity threshold.

9. The apparatus according to claim 8 wherein said control unit is operative to selectively apply the towing vehicle brakes only when said towing vehicle velocity has remained greater than said towing vehicle velocity threshold for a predetermined time period.

10. The apparatus according to claim 8 wherein said control unit is further operative to monitor the towing vehicle direction, said control unit being further operative to selectively apply the towing vehicle brakes only when the towing vehicle is moving in a forward direction.

11. The apparatus according to claim 8 wherein said control valve and said electronic control unit are included in a vehicle stability control system.

12. The apparatus according to claim 8 wherein additional pressure is applied to the selected towing vehicle brakes, said additional pressure being modulated in magnitude and timing such that a brake torque is generated in opposition to vehicle yaw motions.

13. The apparatus according to claim 8 wherein said electronic control unit also monitors the actual towing vehicle yaw movement and delays application of the brakes until an optimal time for application arrives.

14. An apparatus for detecting excessive yaw induced in a towing vehicle by a towed trailer, the apparatus comprising:
   a plurality of vehicle parameter sensors adapted to be mounted upon the towing vehicle; and
   an electronic control unit also adapted to be mounted upon the towing vehicle, said electronic control unit electrically connected to said vehicle parameter sensors, said control unit responsive to signals received from said vehicle parameter sensors to calculate an instability index for the combination of the towing vehicle and the towed trailer that is a function of the towing vehicle yaw rate and, upon said instability index exceeding a predetermined instability threshold, the electronic control unit is further responsive to generate an excessive yaw motion signal.

15. An apparatus for correcting excessive yaw induced in a towing vehicle by a towed trailer, the apparatus comprising:
   a control valve adapted to be connected to the towing vehicle hydraulic brake system, said control valve operable to selectively actuate the towing vehicle wheel brakes;
   a plurality of vehicle parameter sensors adapted to be mounted upon the towing vehicle; and an electronic control unit also adapted to be mounted upon the towing vehicle, said electronic control unit electrically connected to said control valve and said vehicle parameter sensors, said electronic control unit being responsive to signals received from said vehicle parameter sensors to determine an intended maximum yaw rate curve and an actual towing vehicle maximum yaw rate curve and to calculate an instability index for the towing vehicle that is a function of the difference between said intended maximum yaw rate curve and said actual towing vehicle maximum yaw rate curve, said electronic control unit being further responsive, upon said instability index exceeding a predetermined instability threshold to generate an excessive yaw motion signal.

16. The apparatus according to claim 15 wherein said towing vehicle parameter sensors include a steering angle sensor and a plurality of wheel speed sensors adapted to be mounted upon the towing vehicle, said electronic control unit being responsive to signals received from said steering angle sensor and said wheel speed sensors to calculate a driver intended yaw rate and further wherein said intended maximum yaw rate curve is a function of said driver intended yaw rate.

17. The apparatus according to claim 16 wherein said towing vehicle parameter sensors include a yaw rate sensor adapted to be mounted upon the towing vehicle, said yaw rate sensor generating a signal that is proportional to the actual towing vehicle yaw rate and further wherein said actual towing vehicle maximum yaw rate curve is a function of said towing vehicle yaw rate.

18. A method for detecting excessive yaw rate for a towing vehicle towing a trailer, the method comprising:
   (a) providing a plurality of vehicle parameter sensors adapted to be mounted upon the towing vehicle and an electronic control unit adapted to be mounted upon the towing vehicle, the electronic control unit electrically connected to the vehicle parameter sensors;
   (b) monitoring the vehicle parameter sensors with the electronic control unit to determine an instability index for the combination of the towing vehicle and the towed trailer that is a function of the towing vehicle yaw rate; and
   (c) comparing the instability index to a predetermined instability threshold, and upon the instability index exceeding the predetermined instability threshold, generating an excessive yaw motion signal.

19. A method for detecting excessive yaw rate for a towing vehicle towing a trailer, the method comprising:
   (a) providing a plurality of vehicle parameter sensors adapted to be mounted upon the towing vehicle and an electronic control unit adapted to be mounted upon the towing vehicle, the electronic control unit electrically connected to the vehicle parameter sensors;
   (b) monitoring the vehicle parameter sensors with the electronic control unit to determine an intended maximum yaw rate curve and an actual towing vehicle maximum yaw rate curve and to then determine an instability index for the towing vehicle that is a function of the difference between the intended maximum yaw rate curve and the actual towing vehicle maximum yaw rate curve; and
   (c) comparing the instability index to a predetermined instability threshold, and upon the instability index exceeding the predetermined instability threshold, generating an excessive yaw motion signal.

20. The method according to claim 19 wherein vehicle parameter sensors provided in step (a) include a steering angle sensor and a plurality of wheel speed sensors adapted to be mounted upon the towing vehicle and further wherein, during step (b), the electronic control unit is responsive to signals received from the steering angle sensor and the wheel speed sensors to determine a driver intended yaw rate and to use the driver intended yaw rate to calculate the intended maximum yaw rate curve.

21. The method according to claim 19 wherein vehicle parameter sensors provided in step (a) include a yaw rate sensor adapted to be mounted upon the towing vehicle, the yaw rate sensor being operative to generate a signal that is proportional to the actual towing vehicle yaw rate and further wherein, during step (b), the electronic control unit is responsive to the yaw rate sensor signal to calculate the actual towing vehicle maximum yaw rate curve.

22. The method according to claim 21 wherein the plurality of vehicle parameter sensors and the electronic control unit provided in step (a) are included in an electronic brake control system and further wherein the electronic brake system is responsive to an excessive yaw rate signal generated in step (c) to apply the towing vehicle brakes to reduce the vehicle yaw motion.

* * * * *